(12) United States Patent
Lee et al.

(10) Patent No.: US 10,827,125 B2
(45) Date of Patent: Nov. 3, 2020

(54) ELECTRONIC DEVICE FOR PLAYING VIDEO BASED ON MOVEMENT INFORMATION AND OPERATING METHOD THEREOF

(71) Applicant: Samsung Electronics Co., Ltd., Gyeonggi-do (KR)

(72) Inventors: Dongwoo Lee, Gyeonggi-do (KR); Nak-Hoon Kim, Gyeonggi-do (KR); Jihak Kim, Incheon (KR)

(73) Assignee: Samsung Electronics Co., Ltd. (KR)

( * ) Notice: Subject to any disclaimer, the term of this patent is extended or adjusted under 35 U.S.C. 154(b) by 8 days.

(21) Appl. No.: 16/055,832

(22) Filed: Aug. 6, 2018

(65) Prior Publication Data

US 2019/0045099 A1 Feb. 7, 2019

(30) Foreign Application Priority Data

Aug. 4, 2017 (KR) .......................... 10-2017-0099151

(51) Int. Cl.
*H04N 5/232* (2006.01)

(52) U.S. Cl.
CPC ....... *H04N 5/2329* (2013.01); *H04N 5/23238* (2013.01); *H04N 5/23254* (2013.01); *H04N 5/23261* (2013.01); *H04N 5/23267* (2013.01)

(58) Field of Classification Search
CPC ............ H04N 5/2329; H04N 5/23238; H04N 5/23254; H04N 5/23261; H04N 5/23267;
(Continued)

(56) References Cited

U.S. PATENT DOCUMENTS 5,973,733 A 10/1999 Gove
9,843,724 B1 * 12/2017 Brailovskiy ....... H04N 5/23238
(Continued)

FOREIGN PATENT DOCUMENTS

JP 2009017223 1/2009
WO WO-2018027340 A1 * 2/2018 ......... H04N 5/23238

OTHER PUBLICATIONS

Matthias Grundmann, Vivek Kwatra, Daniel Castro, Irfan Essa, "Calibration-Free Rolling Shutter Removal", www.cc.gatech.edu/cpl/projects/rolling shutter, pp. 1-8, 2012.
(Continued)

*Primary Examiner* — Chiawei Chen
(74) *Attorney, Agent, or Firm* — The Farrell Law Firm, P.C.

(57) ABSTRACT

An electronic device is provided and includes a display device and a processor configured to identify a composite image in which one or more first images obtained using a first camera corresponding to a first direction and one or more second images obtained using a second camera corresponding to a second direction are combined, the second direction being different from the first direction, receive a request for playing the composite image, in response to the request for playing the composite image, identify movement information corresponding to a movement which is detected while the one or more first images and the one or more second images are obtained, correct a partial region to be displayed using the display device among regions of the composite image based on at least the movement information, and display a partial image corresponding to the corrected partial region in the composite image on the display device.

20 Claims, 13 Drawing Sheets

(58) Field of Classification Search
CPC .. H04N 13/161; H04N 19/597; H04N 19/124; H04N 19/40; H04N 19/70; H04N 13/156; H04N 13/178; H04N 7/015; H04N 19/59; G06T 3/4038
See application file for complete search history.

(56) References Cited

U.S. PATENT DOCUMENTS

| | | | | |
|---|---|---|---|---|
| 10,013,804 | B2* | 7/2018 | Chui | G06T 19/006 |
| 10,074,401 | B1* | 9/2018 | Volpe | G11B 27/005 |
| 10,142,540 | B1* | 11/2018 | Ribeiro | H04N 5/23238 |
| 10,313,686 | B2* | 6/2019 | Abbas | H04N 19/176 |
| 10,482,574 | B2* | 11/2019 | Adsumilli | H04N 5/23238 |
| 10,484,621 | B2* | 11/2019 | Adsumilli | H04N 19/167 |
| 10,560,682 | B2* | 2/2020 | Abbas | G06T 3/4038 |
| 2003/0160868 | A1* | 8/2003 | Kakou | G08B 13/19602 |
| | | | | 348/143 |
| 2005/0171964 | A1* | 8/2005 | Kulas | G06T 13/00 |
| 2010/0045773 | A1* | 2/2010 | Ritchey | G02B 13/06 |
| | | | | 348/36 |
| 2013/0002712 | A1* | 1/2013 | Fujii | G08B 13/19602 |
| | | | | 345/620 |
| 2014/0267801 | A1* | 9/2014 | Grundmann | H04N 5/2329 |
| | | | | 348/208.1 |
| 2016/0112638 | A1* | 4/2016 | Shen | H04N 5/23248 |
| | | | | 348/208.99 |
| 2016/0131908 | A1 | 5/2016 | Fateh | |
| 2017/0006240 | A1* | 1/2017 | Sron | H04N 9/045 |
| 2017/0148199 | A1* | 5/2017 | Holzer | G06F 16/738 |
| 2017/0351325 | A1* | 12/2017 | Hashimoto | A63F 13/211 |
| 2018/0205934 | A1* | 7/2018 | Abbas | H04N 19/40 |
| 2018/0332219 | A1* | 11/2018 | Corcoran | H04N 5/23267 |
| 2018/0332267 | A1* | 11/2018 | Hesla | H04N 5/9201 |
| 2018/0359419 | A1* | 12/2018 | Hu | H04N 5/23238 |
| 2018/0367733 | A1* | 12/2018 | Sun | H04N 5/23258 |
| 2019/0045099 | A1* | 2/2019 | Lee | H04N 5/2329 |
| 2020/0090303 | A1* | 3/2020 | Zhang | G06T 11/00 |

OTHER PUBLICATIONS

Shuaicheng Liu, Lu Yuan, Ping Tan, Kian Sun, "Bundled Camera Paths for Video Stabilization", National University of Singapore, Microsoft Reseach Asia, https://goo.gl/CcPuMK, pp. 1-10, Jul. 21, 2013.
Tommy Gunn, "Vibrations and Jello effect causes and cures", https://www.flitetest.com/articles/vibrations-and-jello-effect-causes-and-cures, pp. 1-12, May 14, 2013.

* cited by examiner

ELECTRONIC DEVICE FOR PLAYING VIDEO BASED ON MOVEMENT INFORMATION AND OPERATING METHOD THEREOF

CROSS-REFERENCE TO RELATED APPLICATION(S)

This application is based on and claims priority under 35 U.S.C. § 119(a) to Korean Patent Application Serial No. 10-2017-0099151, which was filed on Aug. 4, 2017, in the Korean Intellectual Property Office, the entire disclosure of which is incorporated herein by reference.

BACKGROUND

1. Field

The present disclosure relates, generally, to an electronic device, and more particularly, to an electronic device for playing a video and an operating method thereof.

2. Description of Related Art

Various types of electronic devices are developing into multimedia devices providing various multimedia services. The multimedia service may include at least one of a voice call service, a message service, a broadcasting service, a wireless Internet service, a camera service, a video playing service, and a music playing service.

An electronic device may obtain images of different angles by using at least two cameras oriented to different directions, and may obtain a composite image having a greater angle of view than a predetermined angle of view by combining (e.g., stitching) the images of the different angles. An electronic device may obtain an image of a first direction and an image of a second direction, which is opposite to the first direction, by using two cameras that can obtain an image having an angle of view greater than 180°, and may obtain a composite image corresponding to an angle of view of 360° by combining the image of the first direction and the image of the second direction.

The above information is presented as background information only to assist with an understanding of the present disclosure. No determination has been made, and no assertion is made, as to whether any of the above might be applicable as prior art with regard to the present disclosure.

SUMMARY

When an electronic device shoots a video without using an additional external device for removing shakiness, such as a gimbal or a steady cam, the video images may shake due to a vibration caused by photographer's hand shaking or movement. Accordingly, the electronic device may calculate shake correction information based on a movement path of a camera, and may generate a shake-corrected new image based on the calculated shake correction information. However, since composite images (e.g., a panorama image, a 360° video) are generated by combining images obtained by cameras having a high distortion rate of a lens, high power consumption is, typically, required in electronic devices.

The disclosure has been made to address at least the disadvantages described above and to provide at least the advantages described below. Accordingly, an aspect of the disclosure provides an apparatus for correcting a shake when playing a video formed of composite images in an electronic device, and an operating method thereof.

In accordance with an aspect of the disclosure, there is provided an electronic device. The electronic device includes a display device and a processor configured to identify a composite image in which one or more first images obtained using a first camera corresponding to a first direction and one or more second images obtained using a second camera corresponding to a second direction are combined, the second direction being different from the first direction, receive a request for playing the composite image, in response to the request for playing the composite image, identify movement information corresponding to a movement which is detected while the one or more first images and the one or more second images are obtained, correct a partial region to be displayed using the display device among regions of the composite image based on at least the movement information, and display a partial image corresponding to the corrected partial region in the composite image on the display device In accordance with an aspect of the disclosure, there is provided an operating method of an electronic device. The operating method includes identifying a composite image in which one or more first images obtained using a first camera corresponding to a first direction and one or more second images obtained using a second camera corresponding to a second direction are combined, the second direction being different from the first direction, receiving a request for playing the composite image, in response to the request, identifying movement information corresponding to a movement which is detected while the one or more first images and the one or more second images are obtained, correcting a partial region to be displayed using a display device among regions of the composite image based on at least the movement information, and displaying a partial image corresponding to the corrected partial region in the composite image on the display device.

In accordance with an aspect of the disclosure, there is provided an electronic device. The electronic device includes at least one sensor, a communication module, and a processor configured to obtain one or more first images and one or more second images using a first camera corresponding to a first direction and using a second camera corresponding to a second direction, obtain movement information using the at least one sensor while obtaining the first images and the second images, and transmit, to another electronic device via the communication module, the first images, the second images, and the movement information.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
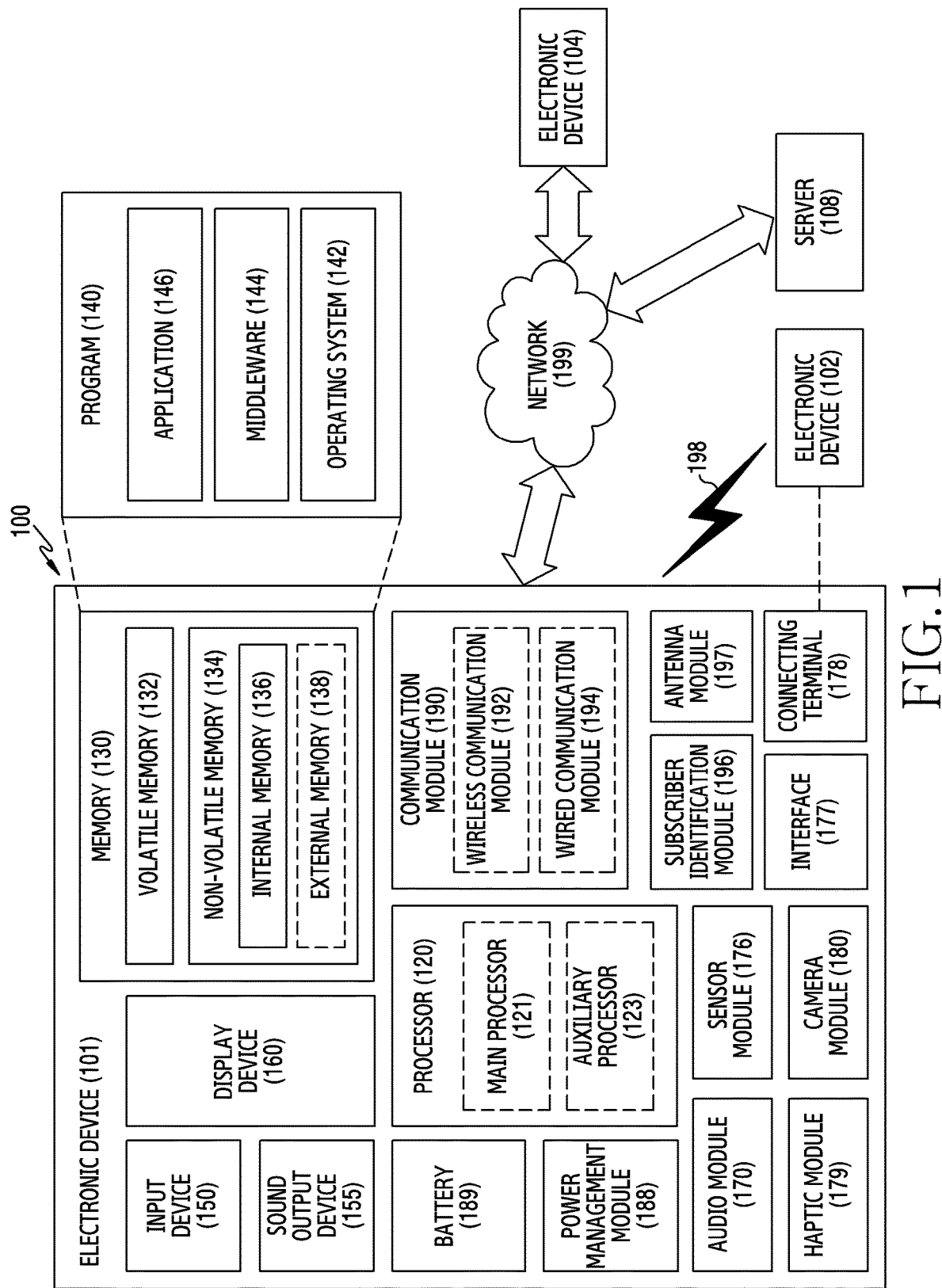
FIG. 1 is a diagram of an electronic device in a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of an electronic device 101 in a network environment 100, according to an embodiment. The electronic device 101 may communicate with an electronic device 102 via a first network 198 (e.g., a short-range wireless communication network), or may communicate with an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. At least one (e.g., the display device 160 or the camera module 180) of the components may be omitted from the electronic device 101, or one or more other components may be added in the electronic device 101. Some of the components may be implemented as single integrated circuitry, system on chip (SoC), or other type of integrated circuit (IC). For example, the sensor module 176 (e.g., a fingerprint sensor, an iris sensor, or an illuminance sensor) may be embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a CPU or an AP), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as embedded in the main processor 121.

The auxiliary processor 123 may control at least some of the functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include a microphone, a mouse, or a keyboard.

The sound output device 155 may output sound signals to the outside of the electronic device 101, and may include a speaker or a receiver. The speaker may be used for general purposes, such as playing multimedia or playing record, and the receiver may be used for incoming calls. The receiver may be implemented as separate from, or as part of, the speaker.

The display device 160 may visually provide information to the user of the electronic device 101. The display device 160 may include a display, a hologram device, or a projector and control circuitry to control a corresponding device. The display device 160 may include touch circuitry or a pressure sensor adapted to measure the intensity of force incurred by a touch.

The audio module 170 may convert a sound into an electrical signal and vice versa. The audio module 170 may obtain the sound via the input device 150, or output the sound via the sound output device 155 or the electronic device 102 (e.g., a speaker or a headphone) wiredly or wirelessly coupled with the electronic device 101.

The sensor module 176 may generate an electrical signal or data value corresponding to an operational state (e.g., power or temperature) of the electronic device 101 or an environmental state external to the electronic device 101. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support a specified protocol to be coupled with the electronic device 102 wiredly or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the electronic device 102, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images, and the camera module 180 may include one or more lenses, image sensors, ISPs, or flashes.

The power management module 188 may manage power supplied to the electronic device 101, and may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may establish a wired or a wireless communication channel between the electronic device 101 and the electronic device 102, the electronic device 104, or the server 108 and performing communication via the established communication channel. The communication module 190 may include one or more communication processors that are operable independently from the processor 120 (e.g., the AP) and supports a wired or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ (BT), wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules 190 may be implemented as a single chip, an SoC, or may be implemented as multi chips separate from each other.

The wireless communication module 192 may identify and authenticate the electronic device 101 in a communication network, using user information stored in the subscriber identification module 196.

The antenna module 197 may include one or more antennas to transmit or receive a signal or power to or from the outside. The communication module 190 (e.g., the wireless communication module 192) may transmit or receive a signal to or from the external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices. If the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used.

Figure 2:
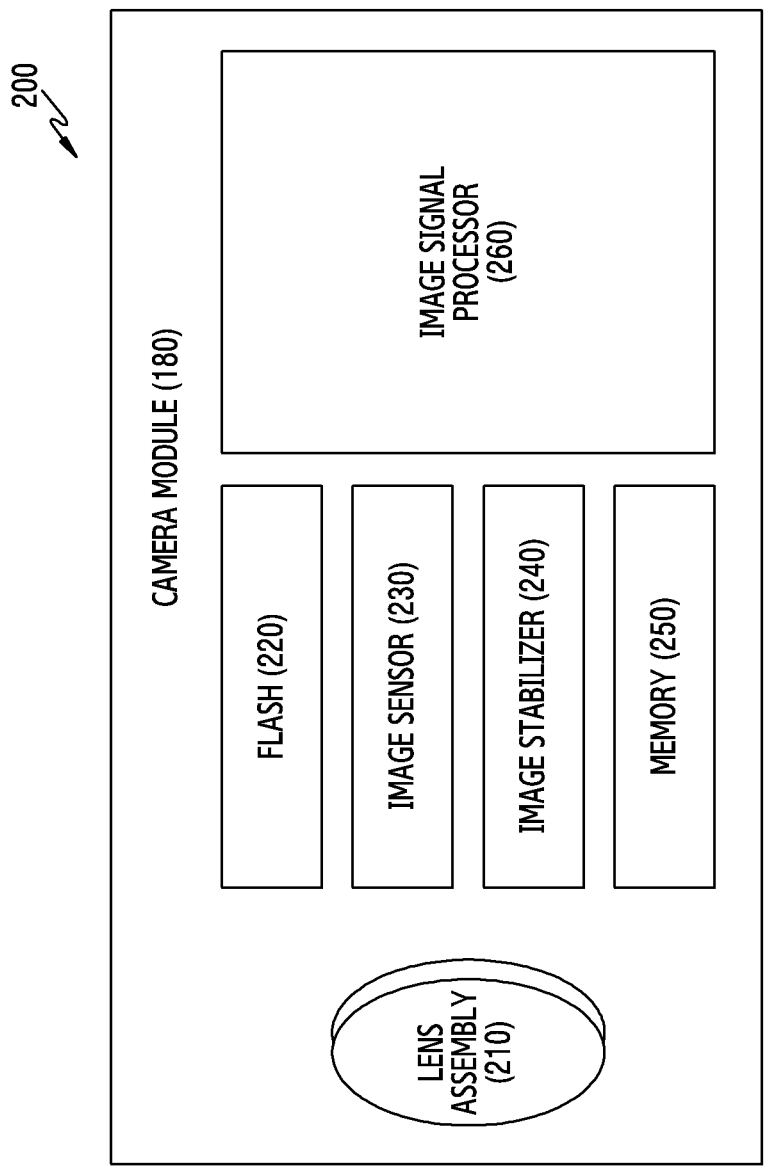
FIG. 2 is a diagram of a camera module, according to an embodiment.

FIG. 2 is a diagram 200 of the camera module 180, according to an embodiment. The camera module 180 may include a lens assembly 210, a flash 220, an image sensor 230, an image stabilizer 240, a memory 250 (e.g., a buffer memory), or an ISP 260.

The lens assembly 210 may collect light emitting from a subject to be photographed, and the lens assembly 210 may include one or more lenses. The camera module 180 may include a plurality of lens assemblies 210. The camera module 180 may be a dual camera, a 360° camera, or a spherical camera. The plurality of lens assemblies 210 may have the same lens attributes (e.g., an angle of view, a focal distance, auto focus, an f number, or an optical zoom), or at least one lens assembly may have at least one different lens attribute from that of another lens assembly. The lens assembly 210 may include a wide-angle lens or a telephoto lens. The flash 220 may emit light to be used to reinforce light emitting from a subject. The flash 220 may include one or more light emitting diodes (LEDs) (e.g., a red-green-blue (RGB) LED, a white LED, an infrared LED, or an ultraviolet LED), or a xenon lamp.

The image sensor 230 may obtain an image corresponding to a subject by converting light transmitted from the subject through the lens assembly 210 into an electric signal. The image sensor 230 may include an image sensor selected from image sensors having different attributes, such as an RGB sensor, a black and white (BW) sensor, an IR sensor, or an ultra violet (UV) sensor, a plurality of image sensors having the same attributes, or a plurality of image sensors having different attributes. Image sensors included in the image sensor 230 may be implemented as a charged coupled device (CCD) sensor or a complementary metal oxide semiconductor (CMOS) sensor.

In response to a movement of the camera module 180 or the electronic device 101 including the same, the image stabilizer 240 may move at least one lens included in the lens assembly 210 or the image sensor 230 in a specific direction, or may control (e.g., controlling a read-out timing) the same, in order to compensate for at least portion of a negative effect (e.g., image shaking) on a shot image, caused by the movement. The image stabilizer 240 may be implemented as an optical image stabilizer, and may detect the movement by using a gyro sensor or an acceleration sensor disposed inside or outside the camera module 180.

The memory 250 may store at least a portion of an image obtained through the image sensor 230 at least temporarily to perform a next image processing operation. When there is a delay in obtaining an image due to a shutter or a plurality of images are obtained at high speed, the obtained original image (e.g., a high-resolution image) may be stored in the memory 250, and a copy image (a low-resolution image) corresponding thereto may be previewed through the display device 160. Thereafter, when a specified condition is satisfied (e.g., a user input or a system command), at least a portion of the original image stored in the memory 250 may be obtained and processed by the ISP 260. The memory 250 may be configured as at least part of the memory 130 or a separate memory that is operable independently therefrom.

The ISP 260 may perform image processing (e.g., generating a depth map, 3D modeling, generating a panorama, extracting a feature point, combining images, or correcting an image (for example, reducing a noise, adjusting a resolution, adjusting brightness, blurring, sharpening, or softening)) with respect to an image obtained through the image sensor 230 or an image stored in the memory 250. Additionally or alternatively, the ISP 260 may control (e.g., controlling an exposure time, or controlling a read-out timing, etc.) at least one (e.g., the image sensor 230) of the elements included in the camera module 180. The image processed by the ISP 260 may be stored in the memory 250 again or may be transmitted to external elements of the camera module 180 (e.g., the memory 130, the display device 160, the electronic device 102, the electronic device 104, or the server 108) to be additionally processed. The ISP 260 may be configured as at least part of the processor 120 or a separate processor operable independently from the processor 120. When the ISP 260 is configured as a separate processor, images processed by the ISP 260 may be displayed through the display device 160 by the processor 120 as they are, or may be displayed after being additionally processed by the processor 120.

The electronic device 101 may include two or more camera modules 180 having different attributes or functions. At least one camera module 180 may be a wide-angle camera or a front facing camera, and at least one other camera module may be a telephoto camera or a rear facing camera.

The electronic device 101 may be one of the various types of electronic devices described above.

Figure 3:
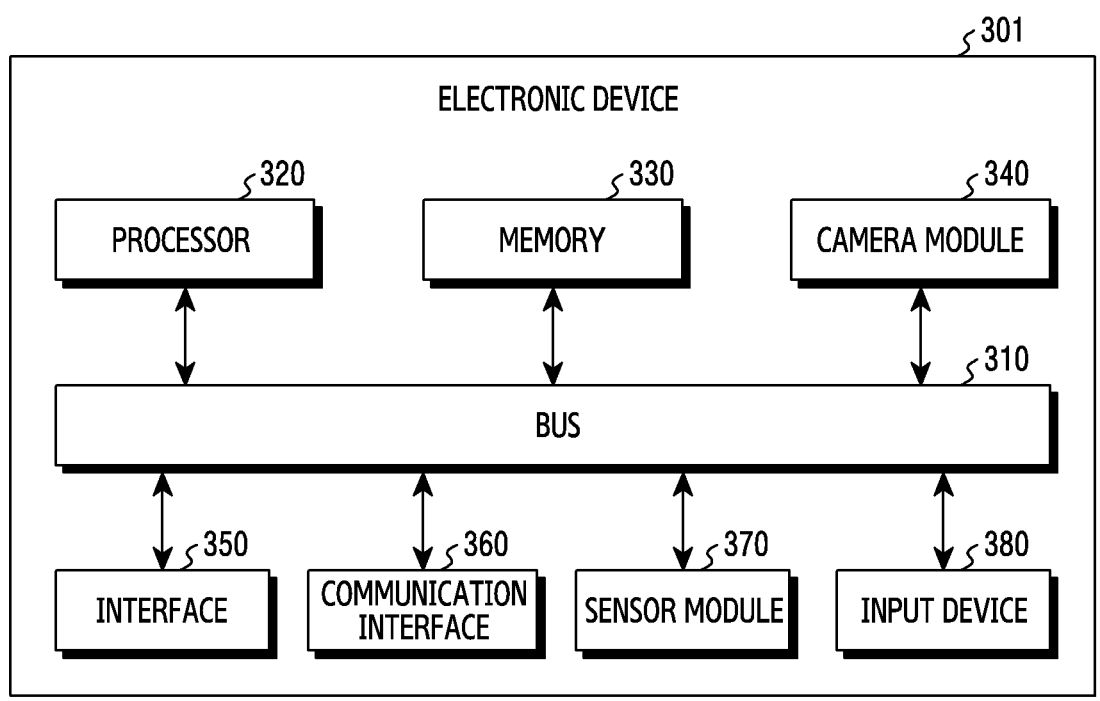
FIG. 3 is a diagram of an external electronic device, according to an embodiment.

FIG. 3 is a diagram of an electronic device 301, according to an embodiment. The electronic device 301 of FIG. 3 may include all or some of the components of the electronic device 101. In FIG. 3 it is assumed that an electronic device shooting a video and an electronic device playing a video are different from each other. The operation of shooting a video and the operation of playing a video may be performed in one electronic device, and in this case, operations of elements of FIG. 3 may be integrated into FIG. 4.

Referring to FIG. 3, the electronic device 301 may include a bus 310, a processor 320, a memory 330, a camera module 340, an interface 350, a communication module 360, a sensor module 370, and an input device 380. The electronic device 301 may omit at least one of the elements or may further include other element(s).

The bus 310 may interconnect the elements (320-380), and may include a circuit for conveying communications (e.g., a control message and/or data) among the elements.

The processor 320 may control the camera module 340 to shoot a video, and may control an operation for storing or transmitting the shot video. The processor 320 may control the camera module 340 to shoot a video based on a video shooting request from another electronic device through the communication module 360 or the interface 350. The processor 320 may control the camera module 340 to shoot a video based on a video shooting request inputted through the input device 380. The processor 320 may control the camera module 340 to be driven in response to the video shooting request being detected. The processor 320 may store images obtained by the camera module 340 in the memory 330 or to transmit the images to the another electronic device via the communication module 360 or the interface 350. The processor 320 may control the camera module 340 to stop shooting the video and/or being driven based on a video shooting end request from the another electronic device through the communication module 360 or the interface 350. The processor 320 may control the camera module 340 to stop making the video and/or being driven based on the video shooting end request inputted through the input device 380.

The processor 320 may store images obtained through the camera module 340 in the memory 330, or may transmit the images to the another electronic device. The processor 320 may transmit images obtained by the camera module 340 to the another electronic device through the communication module 360 or the interface 350 on a real time basis. The processor 320 may store a video content formed of images obtained through the camera module 340 in the memory 330, and may transmit the video content stored in the memory 330 to the another electronic device.

The processor 320 may control the sensor module 370 to obtain movement information of the electronic device 301 while shooting a video through the camera module 340. In response to a video shooting request being detected, the processor 320 may drive the sensor module 370 and may obtain movement information of the electronic device 301 from the sensor module 370 while shooting a video. The movement information of the electronic device 301 may be movement information of at least one camera used to shoot a video. The movement information may include movement component information and rotation component information. The movement component information may be coordinate information on a space which is expressed by x, y, and z, and the rotation component information may be information indicating a rotation state or an inclined angle of the electronic device 301. The rotation component information may include roll information indicating a rotation about the x-axis, pitch information indicating a rotation about the y-axis, and yaw information indicating a rotation about the z-axis.

The movement information may include first movement information indicating a movement of the electronic device 301 that is occurred by a user's intention, and second movement information indicating a movement of the electronic device 301 that is occurred regardless of a user's intention. The first movement information may indicate a movement of the electronic device 301 that is occurred by a location movement of the user, and/or a user's gesture.

The second movement information may indicate a movement of the electronic device 301 that is occurred by at least one of user's shaking, vibration, or hand shaking. The movement information of the electronic device 301 may include time-basis movement information. The time-basis movement information of the electronic device 301 may indicate movement information of the electronic device 301 that is changed and/or maintained according to a flow of time during a time section in which the video is shot.

The processor 320 may associate time information with the movement information of the electronic device 301 by using a timer which is used when the video is shot, and may obtain the time-basis movement information. The processor 320 may associate time information with the movement information of the electronic device 301 based on the timer for measuring a time from the time of starting shooting the video until shooting of the video is ended, and may obtain the time-basis movement information.

The processor 320 may store and/or transmit the movement information of the electronic device 301 with an associated image. The processor 320 may store the movement information of the electronic device 301 in the memory 330 along with the video content formed of the images obtained through the camera module 340.

The processor 320 may store the movement information of the electronic device 301, obtained while shooting the video, in metadata of the video content. The processor 320 may generate a separate file including the movement information of the electronic device 310, obtained while shooting the video, and may associate the generated file with the video content and store the same. The processor 320 may transmit the movement information of the electronic device 301 to the another electronic device through the communication module 360 or the interface 350, along with the image obtained through the camera module 340. The processor 320 may transmit the movement information of the electronic device 301, obtained while shooting the video, to the another electronic device via the communication module 360 or the interface 350, along with the image obtained through the camera module 340 on a real time basis. When shooting of the video is ended, the processor 320 may transmit the metadata of the video content or the separate file including the movement information of the electronic device 301, obtained while shooting the video, to the another electronic device through the communication module 360 or the interface 350.

The processor 320 may store and/or transmit the movement information of the electronic device 301, including the first movement information and the second movement information, as it is, or may process the movement information and store and/or transmit the same. The processor 320 may classify the movement information of the electronic device 301 into the first movement information and the second movement information, and may store or transmit the same. The processor 320 may classify the movement information of the electronic device 301 according to a predetermined time section, and may store and/or transmit an average in each time section.

The processor 320 may obtain a smoothed path by removing a high frequency component from an un-stabilized movement information graph indicating the movement information of the electronic device 301, and may store and/or transmit movement information regarding a movement path and the smoothed path. The processor 320 may calculate a compensation amount for each time regarding the time-basis movement information based on the movement path and the smoothed path, and may store and/or transmit information indicating the calculated compensation amount for each time.

The processor 320 may obtain read-out information regarding video shooting from the camera module 340, and may store and/or transmit the read-out information. The read-out information may be read-out speed information. The processor 320 may generate metadata of the video content including the read-out speed information, and may store and/or transmit the generated metadata. The processor 320 may generate a separate file including the read-out speed information with the movement information of the electronic device 301, and may store and/or transmit the generated file.

The memory 330 may store the images obtained by the camera module 340 and/or the movement information of the electronic device 301 obtained from the sensor module 370. The memory 330 may store the read-out speed information according to a shooting mode. The memory 330 may store read-out speed information regarding the images obtained by the camera module 340.

The camera module 340 may shoot a still image or a video under control of the processor 320. The camera module 340 may obtain images corresponding to different directions, by using a plurality of cameras including lens assemblies (e.g., the lens assemblies 210) corresponding to different directions. The camera module 340 may obtain one or more images corresponding to a first direction by using a first camera including a lens assembly corresponding to the first direction, and may obtain one or more images corresponding to a second direction by using a second camera including a lens assembly corresponding to the second direction. Obtaining images by using the first camera and the second camera is merely an example, and the disclosure is not limited thereto.

The camera module 340 may obtain images corresponding to different directions by using two or more cameras. For example, the camera module 340 may obtain images corresponding to different directions by using two or more cameras having an angle of view larger than 180°.

In another example, the camera module 340 may obtain images corresponding to different directions by using three or more cameras having an angle of view larger than 120°.

The camera module 340 may obtain images corresponding to different directions by using four or more cameras having an angle of view larger than 90°.

The two or more cameras having the angle of view larger than 180°, the three or more cameras having the angle of view larger than 120°, and the four or more cameras having the angle of view larger than 90° may be oriented to different directions to cover the angle of view of 360°. A sum of the angles of view of the cameras used to obtain images corresponding to different directions may be smaller than 360°. The camera module 340 may obtain images corresponding to different directions by using two cameras having an angle of view larger than 120° but smaller (less) than 180°. The camera module 340 may obtain images corresponding to different directions by using three cameras having an angle of view larger than 90° but smaller than 120°.

The camera module 340 may control a read-out speed of at least one camera to be used to shoot a still image or a video, when shooting the still image or the video. The camera module 340 may control a read-out speed of at least one of the plurality of cameras in a photographing mode in which the plurality of cameras are used. The read-out speed may be pre-set according to a photographing mode, and the read-out speed may be changed based on a photographing mode.

The interface 350 and/or the communication module 360 may transmit and receive a control signal related to shooting of the video, and/or outcome data of shooting of the video to and from the another electronic device coupled wirelessly or wiredly. The control signal related to shooting of the video may include at least one of a shooting preparation request signal, a video shooting start request signal, a video shooting temporary stop request signal, a video shooting end request signal, and a shooting environment setting signal. The outcome data of shooting of the video may include at least one of images obtained during shooting of the video, movement information of the electronic device 301 obtained during shooting of the video, and read-out speed information used for shooting the video.

The sensor module 370 may detect a movement of the electronic device 301 during shooting of the video and may obtain movement information indicating the detected movement. For example, the sensor module 370 may obtain time-basis movement information of the electronic device 301 by using at least one of an acceleration sensor and a gyro sensor. The time-basis movement information may indicate movement information of the electronic device 301 that is changed and/or maintained according to a flow of time during a time section in which the video is shot.

The input device 380 may receive a control command or data related to shooting of the video from an outside (e.g., a user) of the electronic device 301.

The electronic device 301 has been described as obtaining images corresponding to different directions by using two cameras for convenience of explanation. However, the disclosure may be equally applied to a case in which the electronic device 301 obtains images corresponding to different directions by using three or more cameras. For example, an electronic device 401 receives images of different directions corresponding to the two cameras from the electronic device 301. A composite image described below may be an image that is obtained by combining images of different directions obtained by using three or more cameras.

Figure 4:
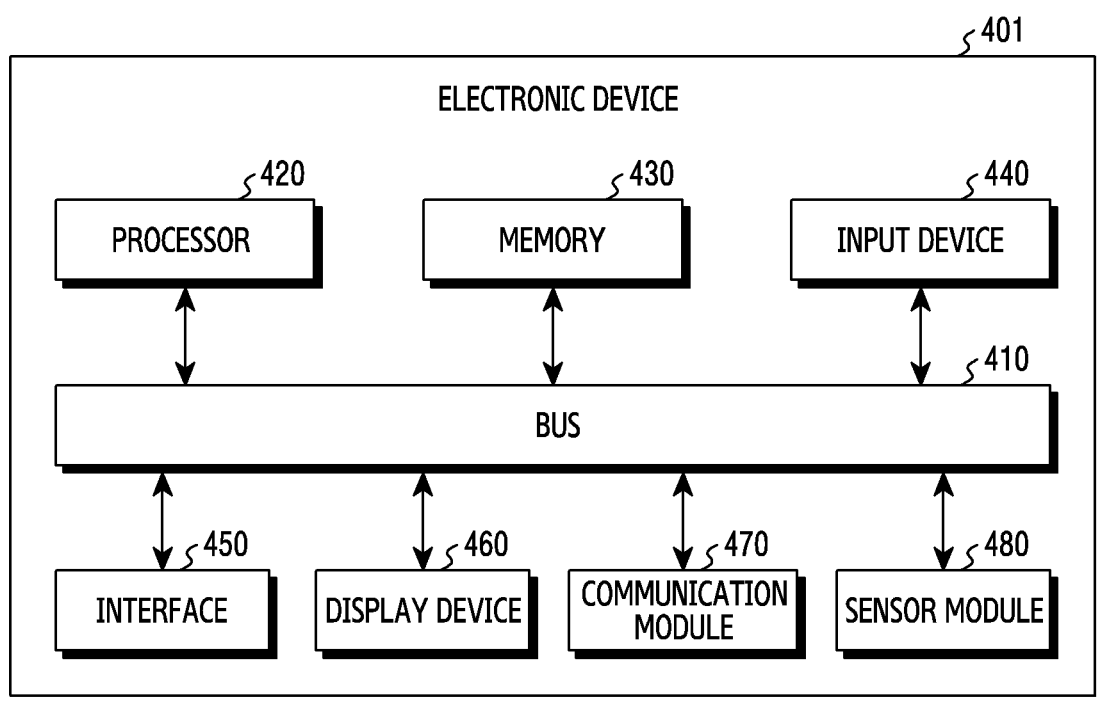
FIG. 4 is a diagram of an electronic device, according to an embodiment.

FIG. 4 is a diagram of the electronic device 401, according to an embodiment. The electronic device 401 of FIG. 4 may include all or some of the components of the electronic device 101. In FIG. 4 the electronic device 401 can be used for shooting a video and for playing the video.

Referring to FIG. 4, the electronic device 401 may include a bus 410, a processor 420, a memory 430, an input device 440, an interface 450, a display device 460, a communication module 470, and a sensor module 480. The electronic device 401 may omit at least one of the elements or may further include other element(s).

The bus 410 may interconnect the elements (420-480), and may include a circuit for conveying communications (e.g., a control message and/or data) among the elements.

The processor 420 may receive one or more images corresponding to a plurality of cameras from another electronic device, and to store the received images in the memory 430. The processor 420 may receive one or more first images corresponding to a first camera, and one or more second images corresponding to a second camera from the another electronic device, and to store the received one or more first images and one or more second images in the memory 430.

The processor 420 may transmit a video shooting start request signal to the another electronic device via the communication module 470, and may control the communication module 470 to receive the one or more first images and the one or more second images in response to the video shooting start request signal. The processor 420 may store the one or more first images and the one or more second images in the memory 430 in the form of a video content.

The processor 420 may store a first video content formed of the one or more first images, and a second video content formed of the one or more second images in the memory 430. The one or more first images and the one or more second images may be images that are obtained by different cameras corresponding to different directions. The one or more first images may be images that are obtained from the first camera corresponding to a first direction, and the one or more second images may be images that are obtained from the second camera corresponding to a second direction. The first direction and the second direction may be different directions from each other. The second direction may be opposite to the first direction.

The processor 420 may receive movement information from the another electronic device via the communication module 470, and may associate the received movement information with the one or more images corresponding to each of the plurality of cameras.

The processor 420 may receive movement information corresponding to the another electronic device or at least one of the plurality of cameras from the another electronic device via the communication module 470, and may associate the received movement information with the one or more first images and the one or more second images, and may store the same in the memory 430. The received movement information may include movement information of the another electronic device that is detected while the one or more first images and the one or more second images are obtained in the another electronic device. The received movement information may be stored in the form of being included in metadata of the first video content including the one or more first images, and/or in metadata of the second video content including the one or more second images, or may be stored as a separate file.

The processor 420 may obtain read-out information related to at least one camera of the plurality of cameras included in the another electronic device. The processor 420 may receive, from the another electronic device via the communication module 470, read-out information related to the first camera corresponding to the one or more first images and the second camera corresponding to the one or more second images. The processor 340 may identify a video shooting mode related to at least one of the plurality of cameras, included in the another electronic device, based on a user input detected through a touch circuit of the display device 460, and may obtain read-out information corresponding to the identified video shooting mode from the memory 430.

The processor 420 may associate the read-out information received via the communication module 470, or the read-out information obtained from the memory 430 with the one or more first images and the one or more second images, and may store the same in the memory 430. The read-out information may be stored in the form of being included in metadata of the first video content including the one or more first images, and/or in metadata of the second video content including the one or more second images, or may be stored as a separate file. The separate file may be a file storing the movement information of the another electronic device that is obtained while the one or more first images and the one or more second images are obtained.

The processor 420 may combine the images obtained by using the plurality of cameras, and may store the combined images in the memory 430. The processor 420 may combine the one or more first images obtained by using the first camera, and the one or more second images obtained by using the second camera, and may generate a video content formed of the combined images.

The processor 420 may store the video content formed of the combined images in the memory 430. The combined image may be an image that has an angle of view larger (greater) than a threshold angle of view. The combined image may be an all-direction image corresponding to the angle of view of 360°. The combined image may be an image that has an angle of view larger than the threshold angle of view and smaller (less) than 360°. The processor 420 may detect a user input requesting generation of a composite image (e.g., a panorama image, a 360° video, etc.) through a touch circuit of the display device 420, and may combine the one or more first images obtained by using the first camera, and the one or more second images obtained by using the second camera in response to the user input requesting generation of the composite image being detected.

The processor 420 may obtain composite images by stitching the one or more first images and the one or more second images. The one or more first images and the one or more second images may be images that are received from the another electronic device via the communication module 470 or the interface 450 and are stored in the memory 430.

According to an embodiment, the processor 420 may include at least one of the movement information and the read-out information associated with the combined images in the metadata of the video content, and store the same, or may include the at least one of the movement information and the read-out information in a separate file associated with the video content and store the same. The movement information associated with the combined images may be movement information that is detected while the one or more first images and the one or more second images, used to generate the combined images, are obtained. The read-out information may include read-out speed information of a camera corresponding to the one or more first images or the one or more second images, used to generate the combined images.

The processor 420 may receive a playing request regarding the composite image, and may identify the movement information associated with the composite image in response to the playing request. The processor 420 may detect a user input while displaying information regarding the composite image on the display device 460, and may determine that the playing request regarding the composite image is received.

The processor 420 may detect a user input while displaying information regarding the video content formed of the combined images on the display device 460, and may determine that the playing request regarding the composite image is received. The information regarding the composite image and/or the information regarding the video content may include a thumbnail image, a name, a capacitance, a shooting date, a correcting date regarding the composite image, or a combination thereof.

The user input may be a touch input or a pressure input that can be detected through the display device 460. The movement information associated with the composite image may be movement information that is detected while the one or more first images and the one or more second images, used to generate the composite image, are obtained. The processor 420 may identify the movement information from the metadata of the video content formed of the one or more first images, the metadata of the video content formed of the one or more second images, or the separate file associated with at least one of the one or more first images and the one or more second images.

In response to the playing request for the composite image, the processor 420 may determine a partial region to be displayed on the display device 460 among regions of the composite image, and may display a partial image corresponding to the determined partial region of the composite image on the display device 460.

The partial region to be displayed on the display device 460 among the regions of the composite image may be determined based on a user input. The processor 420 may detect a user input for determining the partial region to be displayed on the display device 460 among the regions of the composite image, and may determine the partial region to be displayed on the display device 460 among the regions of the composite image, based on the detected user input. The user input may be movement information that is detected through the sensor module 480. When the electronic device is an HMD or an electronic device coupled to the HMD, the processor 460 may detect movement information generated by a user's head movement through the sensor module 480, and may determine an angle of view according to a user's intention based on the detected movement. The processor 460 may display an image of a partial region corresponding to the determined angle of view among all-direction composite images on the display device 460.

The processor 420 may correct the partial region to be displayed on the display device 460 among the regions of the composite image based on at least the movement information associated with the composite image. The processor 420 may determine the partial region to be displayed on the display device 460 among the regions of the composite image based on the user input, and may change a location of the partial region to be displayed on the display device 460 among the regions of the composite image based on the movement information associated with the composite image.

The processor 420 may determine a location variation amount of the partial region to be displayed on the display device 460 based on the movement information associated with the composite image. The processor 420 may change the location of the partial region to be displayed on the display device 460 among the regions of the composite image based on the determined location variation amount.

The processor 420 may obtain shake information from the movement information associated with the composite image, and may determine the location variation amount of the partial region to be displayed on the display device 460 based on the shake information.

The processor 420 may obtain a smoothed path by removing a high frequency component from a movement path corresponding to the movement information associated with the composite image. The processor 420 may determine the location variation amount of the partial region to be displayed on the display device 460 based on the movement path and the smoothed path. The processor 420 may determine a difference between the movement path and the smoothed path according to time, as the location variation amount according to time.

The processor 420 may classify the movement information associated with the composite image according to a predetermined time section, and may determine the location variation amount of the partial region to be displayed on the display device 460 based on an average in each time section. The processor 420 may change the location of the partial region to be displayed on the display device 460 among the regions of the composite image based on the determined location variation amount.

The processor 420 may correct the partial image corresponding to the partial region to be displayed on the display device 460 among the regions of the composite image. The processor 420 may perform warping with respect to the partial image corresponding to the partial region to be displayed on the display device 460 among the regions of the composite image.

The processor 420 may obtain speed information regarding the movement from the movement information associated with the composite image, and may correct the partial image corresponding to the partial region to be displayed on the display device 460 among the regions of the composite image based on at least the speed information regarding the movement.

The processor 420 may identify rolling information regarding the partial region to be displayed on the display device 460 based on the movement information associated with the composite image and the read-out information associated with the composite image, and may correct a rolling effect of the partial image corresponding to the partial region to be displayed on the display device 460 based on the identified rolling information. The read-out information associated with the composite image may be read-out speed information of a camera corresponding to at least one of the one or more first images and the one or more second images used to generate the composite image. The processor 420 may obtain the speed information regarding the movement from the movement information associated with the composite image, and may determine whether there is a rolling effect regarding the partial region to be displayed on the display device 460, by comparing the speed information regarding the movement and the read-out speed information.

When the speed regarding the movement is faster than the read-out speed or the speed regarding the movement and the read-out speed are similar to each other within the same or similar reference range, the processor 420 may determine that there is a rolling effect regarding the partial region to be displayed on the display device 460.

In response to it being determined that there is a rolling effect, the processor 420 may correct the rolling effect based on rolling information regarding the partial region to be displayed on the display device 460. The processor 420 may remove the rolling effect by using one or more suitable methods or devices. When the speed regarding the movement is slower than the read-out speed and a difference between the speed regarding the movement and the read-out speed is beyond a range, the processor 420 may determine that there is no rolling effect regarding the partial region to be displayed on the display device 460. In response to it being determined that there is no rolling effect, the processor 420 may omit the rolling effect correction operation with respect to the partial region to be displayed on the display device 460.

The memory 430 may store the video content formed of the composite image. The memory 430 may store at least one of the movement information and the read-out information associated with the video content. The movement information associated with the video content may include time-basis movement information of at least one camera that is detected while the images corresponding to the video content are obtained through the at least one camera.

The input device 440 may receive a control command or data associated with shooting of the video from an outside (e.g., a user) of the electronic device 401.

The interface 450 and/or the communication module 470 may transmit and receive a control signal related to shooting of the video and/or outcome data of shooting of the video to and from the another electronic device, which can be coupled wirelessly or wiredly to the electronic device 401. The control signal related to shooting of the video may include at least one of a shooting preparation request signal, a video shooting start request signal, a video shooting temporary stop request signal, a video shooting end request signal, and a shooting environment setting signal. The outcome data of shooting of the video may include at least one of images obtained during shooting of the video, movement information of an external electronic device obtained during shooting of the video, and read-out speed information used to shoot the video.

The display device 460 may display the partial region that is determined under control of the processor 420 among the regions of the composite images having the angle of view larger than the threshold angle of view. The display device 460 may display in three dimensions based on the video content formed of the composite images. The display device 460 may detect a user input on the display device 460 based on a touch circuit, and may determine a control command or data related to playing of the video corresponding to the user input.

The sensor module 480 may obtain the movement information of the electronic device during playing of the video. The sensor module 480 may obtain the movement information of the electronic device to change the partial region to be displayed on the display device 460 among the regions of the composite images, by using at least one of the acceleration sensor and the gyro sensor, during playing of the video formed of the composite images.

According to various embodiments, an electronic device may include a display device; and a processor, and the processor may be configured to identify a composite image in which one or more first images obtained by using a first camera corresponding to a first direction and one or more second images obtained by using a second camera corresponding to a second direction are combined, the second direction being different from the first direction; receive a request for playing the composite image; in response to the request, identify movement information corresponding to a movement which is detected while the one or more first images and the one or more second images are obtained; correct a partial region to be displayed by using the display device among regions of the composite image, based on at least the movement information; and display a partial image corresponding to the corrected partial region in the composite image on the display device.

The processor may be configured to determine a location of the partial region based on a movement of the electronic device during at least a portion of a time that the partial image corresponding to the corrected partial region is displayed on the display device.

The processor may be configured to determine shake information based on the movement information, as a portion of the operation of correcting, and to determine the location of the partial region by further using the shake information.

The processor may be configured to determine a location variation amount of the partial region based on the shake information, and to change the location of the partial region determined based on the movement of the electronic device by using the location variation amount.

The movement information may include movement information of the first camera or the second camera according to time, which is detected while the one or more first images and the one or more second images are obtained.

The processor may be configured to, as a portion of the operation of correcting, identify read-out information corresponding to the first camera or the second camera, to determine rolling information related to a rolling effect occurred in the partial region, based on the read-out information and the movement information, and to correct the rolling effect in the partial region at least in part based on the rolling information.

The read-out information may include read-out speed information, and the processor may be configured to, as a portion of the operation of determining the rolling information and correcting the rolling effect, identify speed information based on the movement information, to determine whether there is a rolling effect on the partial region by comparing the speed information and the read-out speed information, and, when it is determined that there is the rolling effect, to correct the partial image corresponding to the partial region.

The read-out information may include read-out speed information of the first camera or the second camera which is used while the one or more first images and the one or more second images are obtained.

The electronic device may further include a memory, and the memory may be configured to store the read-out information associated with at least one of the one or more first images, the one or more second images, and the composite image.

The processor may be configured to receive, from another electronic device via the communication module, the one or more first images obtained by using the first camera and the one or more second images obtained by using the second camera.

According to various embodiments, an electronic device may include a display device; and a processor, and the processor may be configured to identify a composite image in which sub images obtained by using a plurality of cameras corresponding to different directions are combined; receive a request for playing the composite image; in response to the request, identify movement information corresponding to a movement which is detected while the sub images are obtained; correct a partial region to be displayed by using the display device among regions of the composite image, based on at least the movement information; and display a partial image corresponding to the corrected partial region in the composite image on the display device.

According to various embodiments, an electronic device may include at least two cameras corresponding to different directions; at least one sensor; a communication module; and a processor, and the processor may be configured to obtain one or more first images by using a first camera corresponding to a first direction out of the at least two cameras, and obtain one or more second images by using a second camera corresponding to a second direction out of the at least two cameras; obtain movement information by using the at least one sensor while obtaining the first images and the second images; and transmit, to another electronic device via the communication module, the first images, the second images, and the movement information.

The processor may be configured to determine a compensation amount related to at least one of the first images and the second images, based on the movement information, and to transmit information regarding the compensation amount to the another electronic device.

Figure 5:
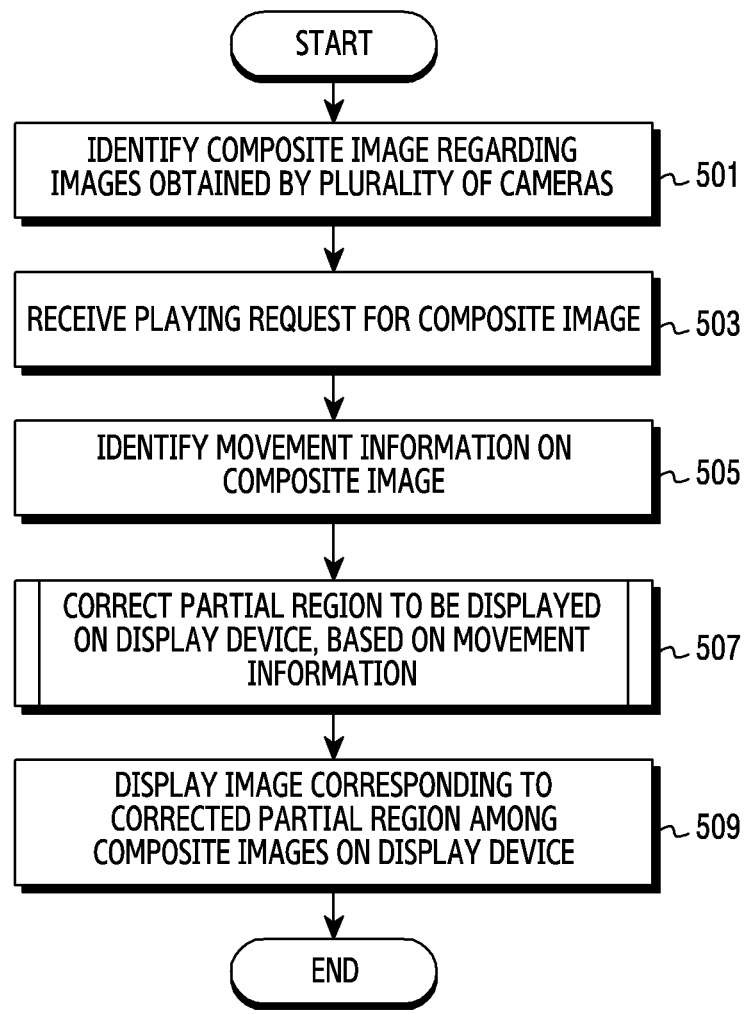
FIG. 5 is a flowchart of a method for playing a video image in an electronic device, according to an embodiment.

FIG. 5 is a flowchart of a method for playing a video image in an electronic device, according to an embodiment. In embodiments described below, operations may be performed in sequence, but may not necessarily be performed in sequence. For example, the order of operations may be changed and at least two operations may be performed in parallel. Herein, the electronic device may be the electronic device 100/301/401, and their respective components.

Referring to FIG. 5, in step 501, the electronic device may identify a composite image regarding images that are obtained by using a plurality of cameras. A processor of the electronic device may identify a composite image in which one or more first images obtained by using a first camera corresponding to a first direction and one or more second images obtained by using a second camera corresponding to a second direction are combined.

The first direction and the second direction may be different directions. The first direction may be opposite to the second direction. The processor of the electronic device may detect occurrence of an event, such as viewing a video content, viewing a video content formed of all-direction images based on a user input and, in response to the event being detected, may identify the composite image regarding the images obtained by using the plurality of cameras. The processor of the electronic device may display information related to the identified composite images on a display device. The information related to the composite images may include a thumbnail image, a name, a capacitance, a shooting date, a correcting date related to the composite images, or a combination thereof.

In step 503, the electronic device may receive a playing request for the composite image. The processor of the electronic device may receive a user input requesting playing of the composite image. The user input may be a touch input on the information related to the composite images displayed on the display device. The touch input may include a long touch, a double touch, a force touch, a drag, or a combination thereof.

In step 505, the electronic device may identify movement information regarding the composite image in response to the playing request for the composite image being received. The movement information regarding the composite image may be movement information of the first camera or the second camera, which is detected while the one or more first images and the one or more second images, used to generate the composite image, are obtained.

The movement information regarding the composite image may include movement component information indicating coordinate information on a space of x, y, and z, and rotation component information indicating a rotation state or an inclined angle of the electronic device. The movement information regarding the composite image may include first movement information indicating a movement of the electronic device occurred by a user's intention, and second movement information indicating a movement of the electronic device occurred regardless of a user's intention, e.g., a shake.

The processor of the electronic device may obtain time-basis movement information regarding the composite image. The processor of the electronic device may identify movement information regarding a composite image to be displayed on the display device at a first time, among the composite images forming a video content, based on the time-basis movement information.

In step 507, the electronic device may correct a partial region to be displayed on the display device among regions of the composite image based on the movement information of the composite image.

The processor of the electronic device may determine a partial region to be displayed based on an input, and may correct a location of the partial region to be displayed on the display device 460 among the regions of the composite image based on the movement information associated with the composite image.

The operation of correcting the location of the partial region to be displayed will be described in greater detail with reference to FIGS. 6-8. The processor of the electronic device may perform warping with respect to a partial image corresponding to the partial region to be displayed on the display device 460 among the regions of the composite image.

The processor of the electronic device may obtain rolling information regarding the corresponding composite image based on the movement information regarding the composite image, and may correct a rolling effect of the partial image corresponding to the partial region to be displayed on the display device based on the rolling information. The operation of correcting the rolling effect of the partial image corresponding to the partial region to be displayed will be described in greater detail with reference to FIGS. 9-11.

In step 509, the electronic device may display an image corresponding to the corrected partial region of the composite image on the display device. The processor of the electronic device may display the partial image corresponding to the corrected partial region of the composite image having an angle of view larger than a threshold angle of view on the display device 460.

In FIG. 5 steps 507 and 509 may be iteratively performed until playing of the video is ended. For example, when playing the video, the processor of the electronic device may continue correcting the partial region to be displayed on the display device 460 based on the time-basis movement information, which is obtained while the images of the corresponding video are shot.

Figure 6:
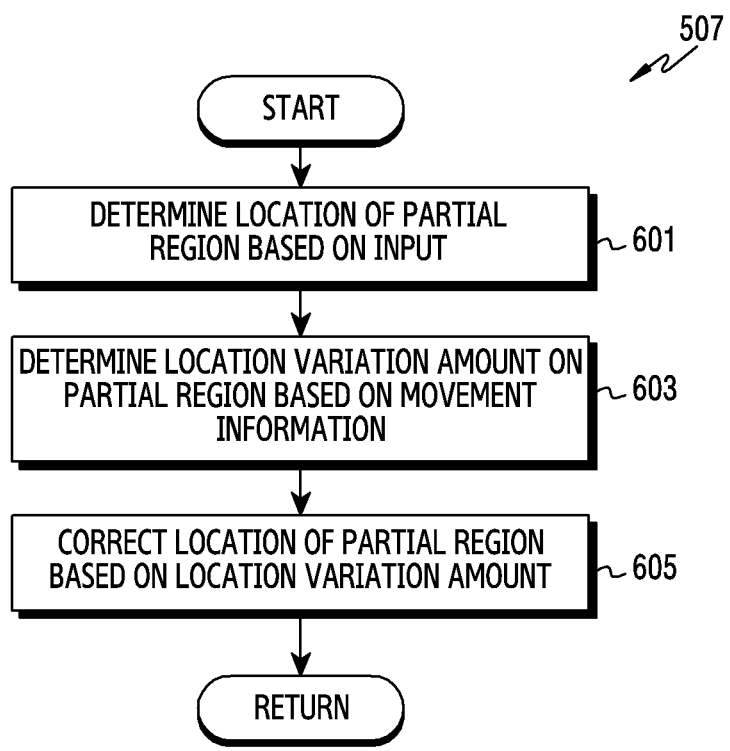
FIG. 6 is a flowchart of a method for correcting a shake based on movement information in an electronic device, according to an embodiment.

FIG. 6 is a flowchart of a method for correcting a shake based on movement information in an electronic device, according to an embodiment. FIG. 7 is a graph of movement information which is used to correct a shake in an electronic device, according to an embodiment, and FIG. 8 is a diagram of correcting a shake based on movement information in an electronic device, according to an embodiment.

In the following description, the electronic device may be the electronic devices 101/301/401, and their respective components.

Referring to FIG. 6, in step 601, the electronic device may determine a location of a partial region based on an input. The processor of the electronic device may determine an angle of view corresponding to a user intention based on an input, and may determine a region corresponding to the determined angle of view among regions of the composite image having an angle of view larger (i.e., greater) than a threshold angle, as a partial region to be displayed on the display device.

For example, the processor of the electronic device may obtain movement information from a sensor module, and may determine an angle of view corresponding to a user intention based on the obtained movement information. The movement information may include movement component information indicating a location of a user's face on coordinates on a space expressed by x, y, and z, and rotation component information indicating at least one of a face direction, a face rotation state, and a face's inclined angle of the user.

The processor of the electronic device may determine an angle of view corresponding to a user's face location, face direction, face rotation state, a face's inclined angle, or a combination thereof, based on the movement information obtained from the sensor module, and may determine a region corresponding to the determined angle of view as a partial region to be displayed on the display device 460.

In step 603, the electronic device may determine a location variation amount regarding the partial region based on movement information. The processor of the electronic device may identify movement information regarding a composite image to be displayed on the display device at a first time among composite images forming a video content, and may determine a location variation amount of the partial region to be displayed on the display device at the first time, based on the identified movement information.

The processor of the electronic device may obtain shake information corresponding to the first time from time-basis movement information associated with the composite image, and may determine a location variation amount of the partial region to be displayed on the display device 460 based on shake information corresponding to the first time.

The processor of the electronic device may obtain a smoothed path without a shake component by removing a high frequency component from a movement path corresponding to the movement information associated with the composite image, and may determine the location variation amount of the partial region to be displayed on the display device based on the movement path and the smoothed path.

Figure 7:
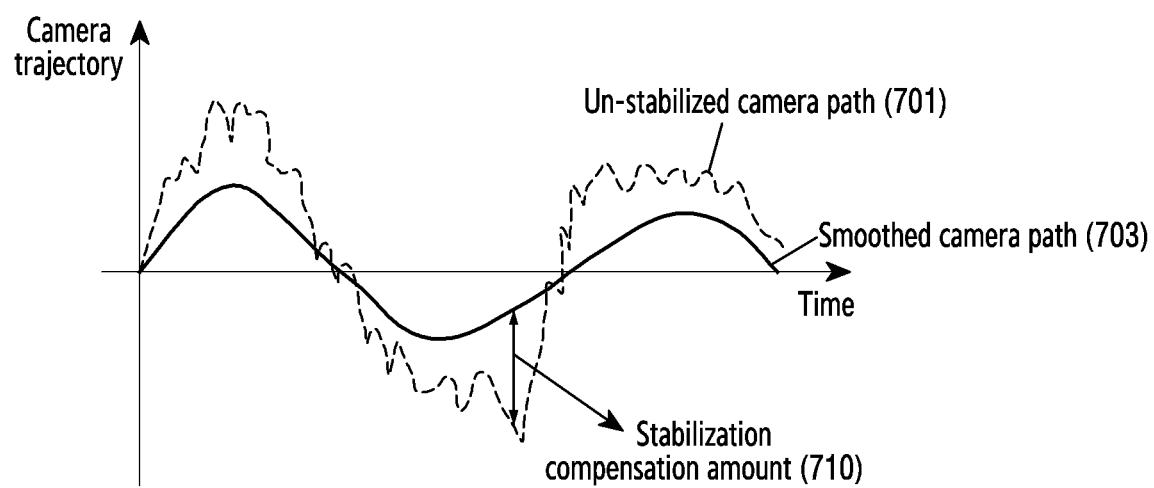
FIG. 7 is a graph illustrating movement information used for correcting a shake in an electronic device, according to an embodiment.
Figure 8:
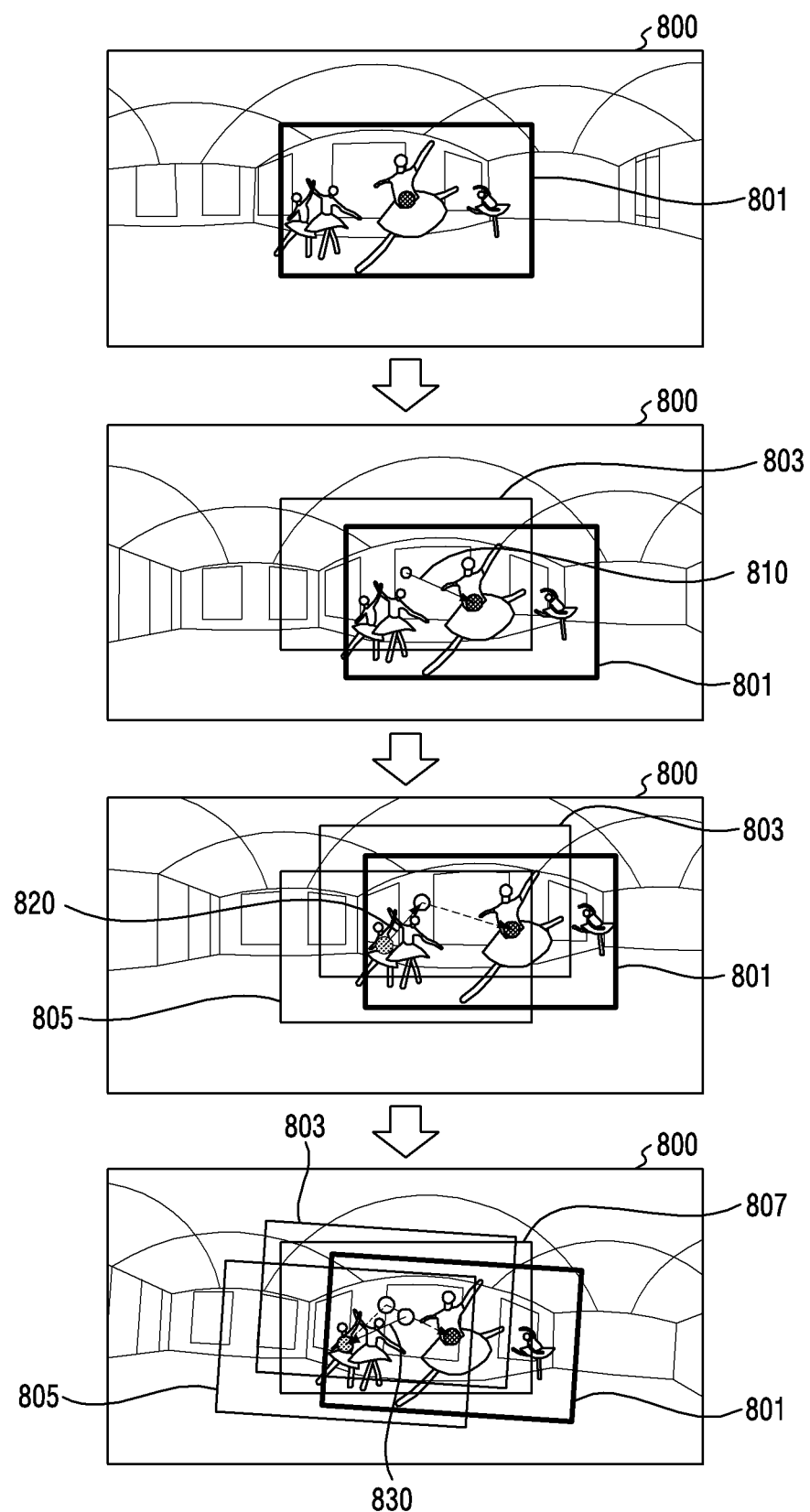
FIG. 8 is a diagram of correcting a shake based on movement information in an electronic device, according to an embodiment.

For example, as shown in FIG. 7, the processor of the electronic device may obtain an un-stabilized camera path 701 based on the movement information associated with the composite image, and may obtain a smoothed camera path 703 by removing a high frequency component from the un-stabilized path. The processor of the electronic device may determine a difference between the un-stabilized camera path 701 and the smoothed camera path 703 as a stabilization compensation amount 710, and may determine a location variation amount of the partial region to be displayed on the display device based on the stabilization compensation amount 710.

The un-stabilized camera path 701 may indicate a camera trajectory detected over time while one or more first images and one or more second images used to generate the corresponding video content are shot. The processor of the electronic device may classify the movement information associated with the composite image according to a predetermined time section, and may determine the location variation amount of the partial region to be displayed on the display device based on an average in each time section.

In step 605, the electronic device may correct the location of the partial region based on the location variation amount. The processor of the electronic device may change the location of the partial region to be displayed on the display device among the regions of the composite image based on the determined location variation amount.

The processor of the electronic device may determine a partial region to be displayed on the display device among all regions of a composite image 800 to a first partial region 801 of a first time, a second partial region 803 of a second time, a third partial region 805 of a third time, and a fourth partial region 807 of a fourth time based on movement information obtained from the sensor module.

The processor of the electronic device may calculate a location variation amount corresponding to each of the second time, the third time, and the fourth time through step 603. The processor of the electronic device may display a partial image corresponding to the first partial region 801 on the display device at the first time, and may perform a first correction 810 to change the location of the partial region of the second time from the second partial region 803 to the first partial region 801 based on the location variation amount of the second time, and display the partial image corresponding to the first partial region 801 at the second time.

The processor of the electronic device may perform a second correction 820 to change the location of the partial region of the third time from the third partial region 805 to the second partial region 803 based on the location variation amount of the third time, and may display the partial image corresponding to the second partial region 803 at the third time.

The processor of the electronic device may perform a third correction 830 to change the location of the partial region of the fourth time from the fourth partial region 807 to the third partial region 805 based on the location variation amount of the fourth time, and may display the partial image corresponding to the third partial region 805 at the fourth time.

Figure 9:
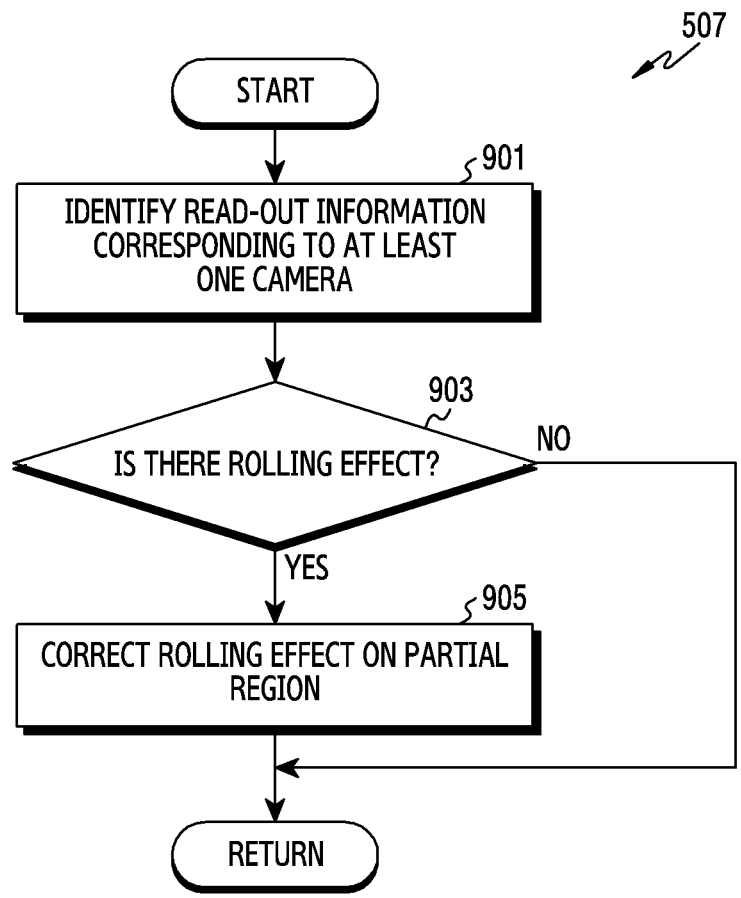
FIG. 9 is a flowchart of a method for correcting a partial region to be displayed on a display device based on movement information in an electronic device, according to an embodiment.
Figure 10:
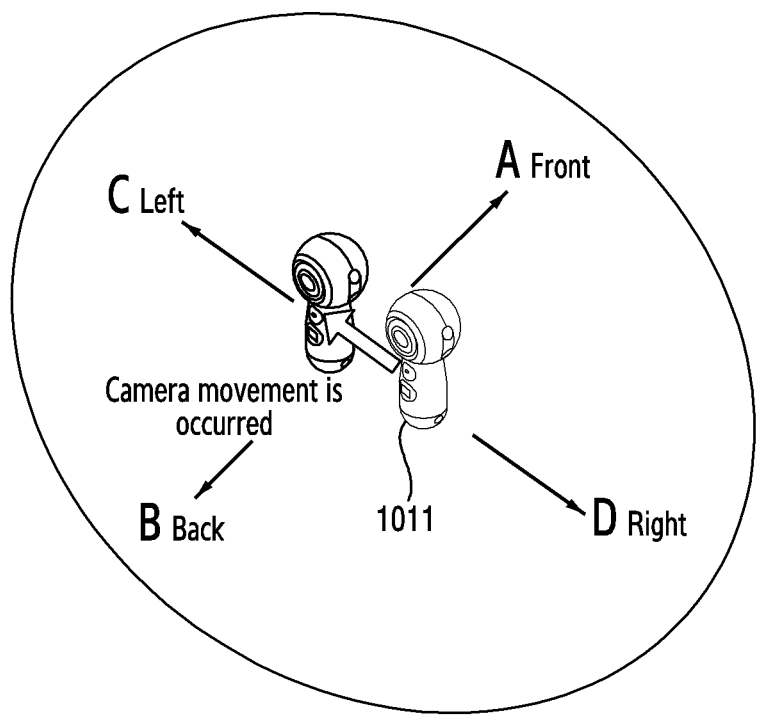
FIG. 10 is a diagram of movements during shooting by an external electronic device, according to an embodiment.
Figure 11:
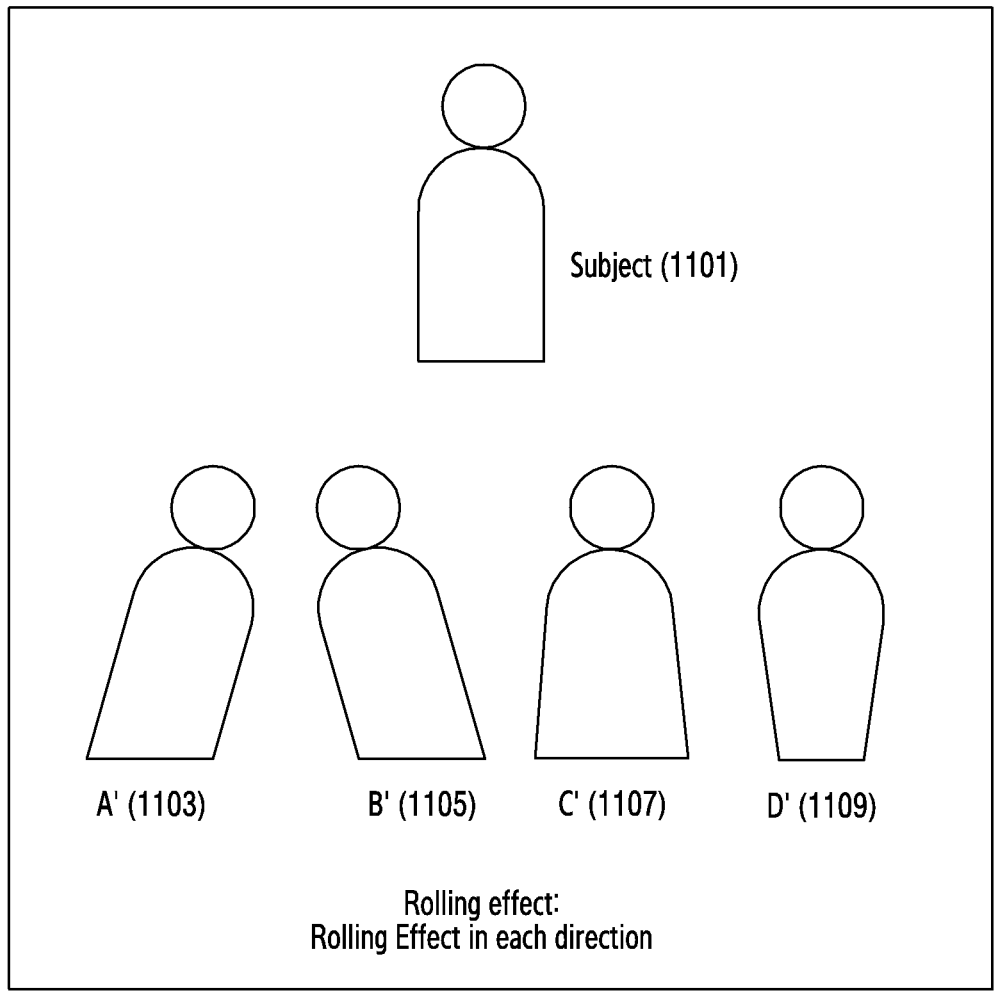
FIG. 11 is a diagram of a rolling effect caused by a movement during shooting by an external electronic device, according to an embodiment.

FIG. 9 is a flowchart of a method for correcting a partial region to be displayed on a display device based on movement information in an electronic device, according to an embodiments. FIG. 10 is a diagram of a movement of an external device during shooting, according to an embodiment. FIG. 11 is a diagram of a rolling effect occurred by a movement during shooting in an external device, according to an embodiment.

In the following description, the electronic device may be the electronic devices 101/301/401 and their respective components.

Referring to FIG. 9, in step 901, the electronic device may identify read-out information corresponding to at least one camera. The read-out information may include read-out information of a camera which is used to obtain one or more first images and one or more second images used to generate a composite image. For example, the read-out information may be read-out speed information of a first camera corresponding to the one or more first images or a second camera corresponding to the one or more second images. The processor of the electronic device may obtain the read-out information from metadata of a corresponding video content formed of composite images, or from a file stored in association with the corresponding video content.

In step 903, the electronic device may determine whether there is a rolling effect in the composite image based on the read-out information. The processor of the electronic device may identify rolling information regarding the partial region to be displayed on the display device 460 based on the read-out information. The rolling information regarding the partial region to be displayed on the display device 460 may indicate whether there is a rolling effect in the corresponding partial region.

The processor of the electronic device may identify movement speed information from the movement information of the composite image, and may determine whether there is a rolling effect in the composite image by comparing the movement speed information and the read-out speed information. When the movement speed is faster than the read-out speed or the movement speed and the read-out speed are equal to or similar to each other within a reference range, the processor of the electronic device may determine that there is a rolling effect in the composite image.

When the movement speed is slower than the read-out speed and a difference between the movement speed and the read-out speed is beyond the range, the processor of the electronic device may determine that there is no rolling effect in the composite image. The processor of the electronic device may determine whether there is a rolling effect in the partial region to be displayed on the display device 460 based on whether there is a rolling effect in the composite image.

For example, when there is a rolling effect in the composite image, the processor of the electronic device may determine that there is a rolling effect in the partial region to be displayed on the display device 460. When there is no rolling effect in the composite image, the processor of the electronic device may determine that there is no rolling effect in the partial region to be displayed on the display device 460. The rolling effect may occur by a camera movement at an image obtaining time, and/or a movement of a subject at the image obtaining time.

For example, when an electronic device 1011 including a first camera and a second camera is moved in a specific direction by a user motion while obtaining one or more first images and one or more second images as shown in FIG. 10, a rolling effect may occur according to a location of a subject. For example, referring to FIGS. 10 and 11, when the subject 1101 exists at an A location, a B location, a C location, or a D location, an image obtained by the electronic device 1011 through the first camera and/or the second camera may include the subject to which the rolling effect such as A' 1103, B' 1105, C' 1107, or D'1109 is applied.

In step 905, the electronic device may correct the rolling effect of a partial image corresponding to the partial region to be displayed on the display device. The processor of the electronic device may obtain rolling information regarding the corresponding composite image based on the movement information regarding the composite image, and may correct to remove the rolling effect of the partial image corresponding to the partial region to be displayed on the display device based on the rolling information.

Figure 12:
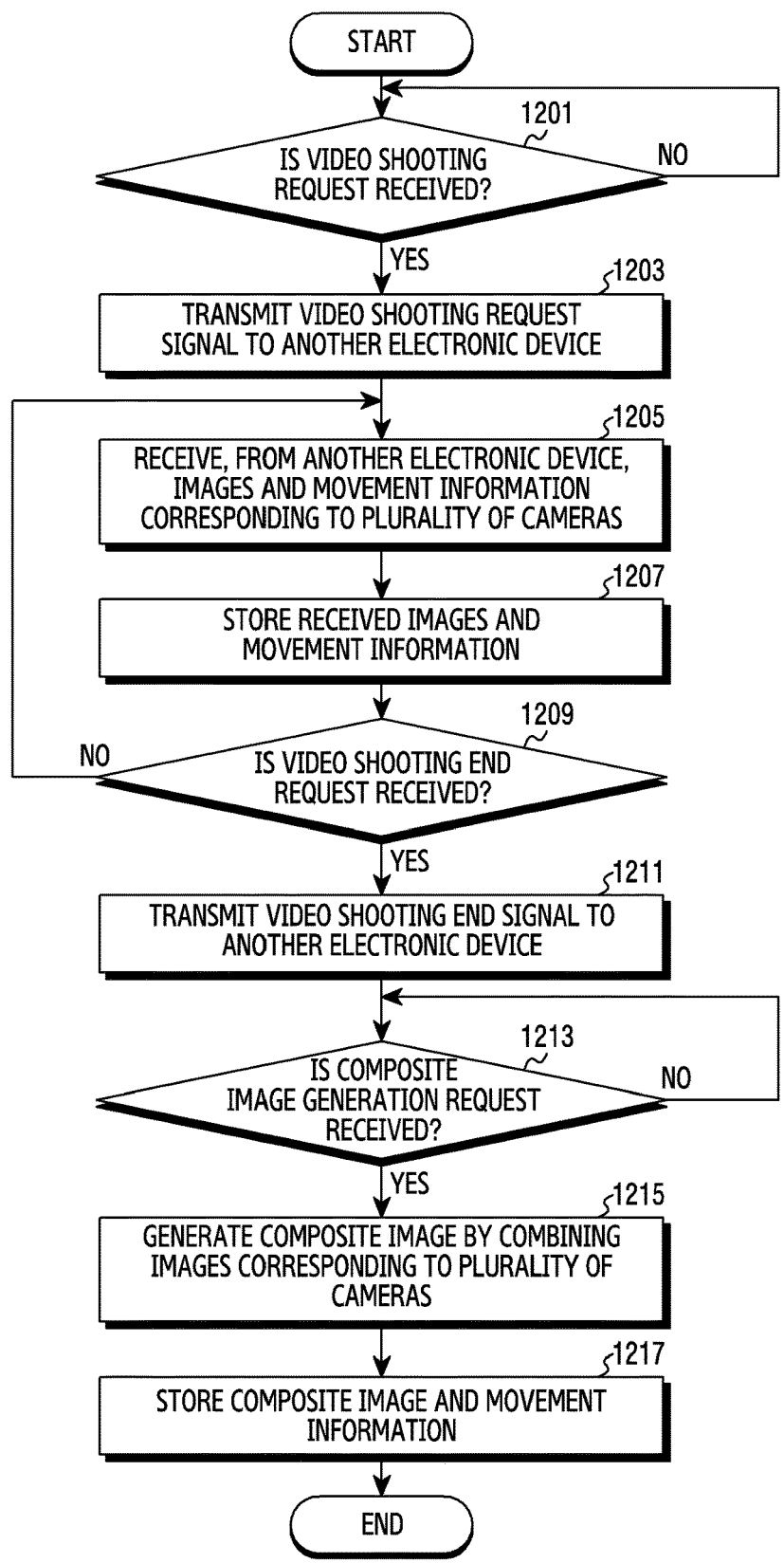
FIG. 12 is a flowchart of a method for storing a video shot in an electronic device, according to an embodiment.

FIG. 12 is a flowchart of a method for storing a video shot in an electronic device, according to an embodiment. Operations in FIG. 12 may be performed before step 501 of FIG. 5 is performed. In the following description, the electronic device may be the electronic devices 101/301/401 and their respective components.

Referring to FIG. 12, in step 1201, the electronic device may determine whether a video shooting request is received. A processor of the electronic device may detect a user input requesting a video shooting start based on a touch circuit included in a display device. The processor of the electronic device may receive a signal requesting a video shooting start from an input device.

In step 1203, the electronic device may transmit a video shooting request signal to another electronic device. In response to the video shooting request being received, the processor of the electronic device may transmit a signal requesting shooting of a video to the another electronic device including a plurality of cameras. The another electronic device may include a plurality of cameras and may be coupled with the electronic device wiredly or wirelessly.

In step 1205, the electronic device may receive images and movement information corresponding to the plurality of cameras from the another electronic device. The processor of the electronic device may receive one or more first images corresponding to a first camera, and one or more second images corresponding to a second camera from another electronic device wiredly or wirelessly, and may receive movement information corresponding to the first camera or the second camera.

The movement information corresponding to the first camera or the second camera may indicate a movement of the first camera or the second camera detected while the first images and the second images are obtained. The movement information may be received on a real time basis or at predetermined intervals. The processor of the electronic device may receive movement information on a real time basis every time movement information is measured by the another electronic device. The processor of the electronic device may receive movement information that has been accumulated during a corresponding time section at predetermined intervals. The movement information may be classified into first movement information and second movement information, and may be received. The movement information may include information regarding a location variation amount for correcting a shake.

In step 1207, the electronic device may store the received images and movement information. The processor of the electronic device may classify the images into the one or more first images corresponding to the first camera and one or more second images corresponding to the second camera, and may store the images. The processor of the electronic device may classify and store the images to form a first video content with the one or more first images corresponding to the first camera, and to form a second video content with the one or more second images corresponding to the second camera.

The processor of the electronic device may also store information indicating that the one or more first images corresponding to the first camera and the one or more second images corresponding to the second camera can be combined. The processor of the electronic device may include the movement information in metadata of the one or more first images corresponding to the first camera and in metadata of the one or more second images corresponding to the second camera, and store the movement information, or may store the movement information in a separate file associated with the first images and the second images.

In step 1209, the electronic device may determine whether a video shooting end request is received. The processor of the electronic device may detect a user input requesting a video shooting end, based on a touch circuit included in the display device. The processor of the electronic device may receive a signal requesting the video shooting end from the input device. When the video shooting end request is not received, the electronic device may return to step 1205 to continue receiving the images and the movement information corresponding to the plurality of cameras from another electronic device.

When the shooting end request is received, the electronic device may transmit a video shooting end request signal to another electronic device in step 1211. The processor of the electronic device may transmit a signal requesting a video shooting end to another electronic device in response to the video shooting end request being received.

In step 1213, the electronic device may determine whether a composite image generation request is received. The processor of the electronic device may determine whether a request for generating a video, formed of composite images having an angle of view larger than a threshold angle of view, by combining the one or more first images corresponding to the first camera and the one or more second images corresponding to the second camera, is received.

The processor of the electronic device may detect a user input requesting generation of a composite image based on a touch circuit included in the display device. The processor of the electronic device may receive a signal requesting generation of a composite image from the input device.

When the composite image generation request is received, the electronic device may generate a composite image by combining the images corresponding to the plurality of cameras in step 1215. In response to the composite image generation request, the processor of the electronic device may generate composite images having an angle of view larger than the threshold angle of view by combining the one or more first images corresponding to the first camera and the one or more second images corresponding to the second camera.

In step 1217, the electronic device may store the composite image and the movement information. According to an embodiment, the processor of the electronic device may generate and store a video content formed of the generated composite images. The processor of the electronic device may obtain the movement information from the metadata of the one or more first images, the metadata of the one or more second images, or the separate file associated with the first images and the second images, and may associate the obtained movement information with the composite images and may store the same.

The processor of the electronic device may include the obtained movement information in the metadata of the video content formed of the composite images and store the same, or may store the movement information in the separate file associated with the video content formed of the composite images.

In FIG. 12 described above, the electronic device may receive the movement information of the another electronic device on a real time basis or at predetermined intervals. However, the electronic device may not receive the movement information while the video is shot, and, in response to the video shooting end request signal, may receive all pieces of the movement information obtained while the video is shot.

Figure 13:
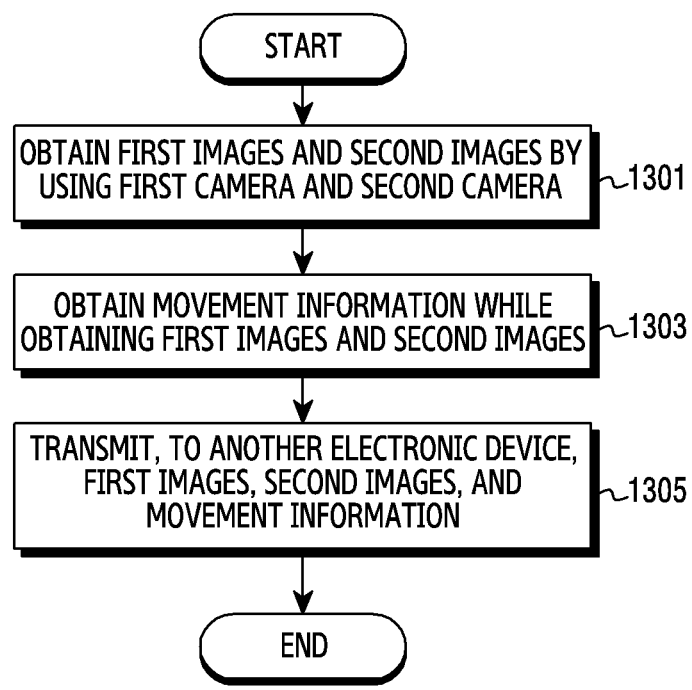
FIG. 13 is a flowchart of a method for shooting a video in an external electronic device, according to an embodiment.

FIG. 13 is a flowchart of a method for shooting a video in an external electronic device, according to an embodiment. Herein, the electronic device may be the electronic devices 101/301/401 and their respective components.

Referring to FIG. 13, in step 1301, the electronic device may obtain one or more first images and one or more second images by using a first camera corresponding to a first direction and a second camera corresponding to a second direction. The processor of the electronic device may obtain the one or more first images by using the first camera corresponding to the first direction among the plurality of cameras provided in the electronic device, and may obtain the one or more second images by using the second camera corresponding to the second direction. The first direction and the second different may be different from each other. For example, the first direction may be opposite to the second direction.

In response to a video shooting request signal being received, the processor of the electronic device may obtain the one or more first images and the one or more second images. The processor of the electronic device may receive the video shooting request signal from another electronic device coupled wiredly or wirelessly via an interface or a communication module, and may obtain the one or more first images and the one or more second images in response to the video shooting request signal being received.

The electronic device may obtain movement information while obtaining the first images and the second images in step 1303. The processor of the electronic device may obtain movement information corresponding to the first camera or the second camera through a sensor module, while obtaining the first images and the second images through the first camera and the second camera. The movement information may include movement component information and rotation component information. The movement component information may be coordinate information on space expressed by x, y, and z, and the rotation component information may be information indicating a rotation state or an inclined angle of the electronic device.

The rotation component information may include roll information indicating a rotation about the x-axis, pitch information indicating a rotation about the y-axis, and yaw information indicating a rotation about the z-axis. The movement information may include first movement information indicating a movement of the electronic device that is occurred by a user's intention, and second movement information indicating a movement of the electronic device that is occurred regardless of a user's intention. The second movement information may indicate a movement of the electronic device occurred by at least one of user's shaking, vibration, or hand shaking.

The processor of the electronic device may obtain time-basis movement information indicating movement information of the electronic device that is changed and/or maintained according to a flow of time during a time section in which a video is shot. Steps 1301 and 1303 may be performed in parallel. For example, the processor of the electronic device may obtain the movement information corresponding to the first camera or the second camera while obtaining the first images and the second images.

In step 1305, the electronic device may transmit the first images, the second images, and the movement information to another electronic device. The processor of the electronic device may transmit, to another electronic device via the communication module, the one or more first images obtained by using the first camera, the one or more second images obtained by using the second camera, and the movement information corresponding to the first camera or the second camera.

The processor of the electronic device may transmit, to another electronic device, the one or more first images obtained by using the first camera, and the one or more second images obtained by using the second camera on a real time basis. For example, the processor of the electronic device may transmit the obtained first images and second images to another electronic device every time the first images and the second images are obtained. The movement information may be transmitted on a real time basis or at predetermined intervals. The processor of the electronic device may transmit the movement information to another electronic device on a real time basis every time the movement information is detected through the sensor module.

The processor of the electronic device may transmit the movement information that has been accumulated during a corresponding time section to another electronic device at predetermined intervals. The processor of the electronic device may classify the movement information into first movement information and second movement information, and may transmit the classified first movement information and second movement information to another electronic device.

The processor of the electronic device may determine a compensation amount related to at least one of the first images and the second images based on the obtained movement information, and may transmit information regarding the determined compensation amount to another electronic device. The processor of the electronic device may determine a location variation amount for each time to correct a shake in a composite image related to at least one of the first images and the second images based on the obtained movement information, and may transmit information regarding the determined location variation amount for each time to another electronic device.

In FIG. 13, the electronic device may finish obtaining and transmitting the images and the movement information, in response to a video shooting end request signal being received. The processor of the electronic device may receive a signal requesting a video shooting end from another electronic device coupled wiredly or wirelessly via the interface or the communication module.

The processor of the electronic device may continue performing steps 1301, 1303, and 1305 until the video shooting end request signal is received.

In FIG. 13 the electronic device transmits the movement information on a real time basis or at predetermined intervals, but the disclosure is not limited thereto. For example, the electronic device may not transmit the movement information while shooting the video, and, in response to the video shooting end request signal being received, may transmit all pieces of movement information obtained while the video is shot to another electronic device.

According to various embodiments, an operating method of an electronic device may include identifying a composite image in which one or more first images obtained by using a first camera corresponding to a first direction and one or more second images obtained by using a second camera corresponding to a second direction are combined, the second direction being different from the first direction; receiving a request for playing the composite image; in response to the request, identifying movement information corresponding to a movement which is detected while the one or more first images and the one or more second images are obtained; correcting a partial region to be displayed by using a display device among regions of the composite image, based on at least the movement information; and displaying a partial image corresponding to the corrected partial region in the composite image on the display device.

Correcting may include determining a location of the partial region based on a movement of the electronic device while displaying the partial image corresponding to the corrected partial region on the display device.

Correcting may include determining shake information based on the movement information; and determining the location of the partial region by further using the shake information.

Correcting may include determining a location variation amount of the partial region based on the shake information; and changing the location of the partial region determined based on the movement of the electronic device by using the location variation amount.

The movement information may include movement information of the first camera or the second camera according to time, which is detected while the one or more first images and the one or more second images are obtained, and Correcting may include identifying read-out information corresponding to the first camera or the second camera; determining rolling information related to a rolling effect occurred in the partial region, based on the read-out information and the movement information; and correcting the rolling effect in the partial region at least in part based on the rolling information.

The read-out information may include read-out speed information, and determining the rolling information and correcting the rolling effect includes: identifying speed information based on the movement information, and comparing the speed information and the read-out speed information; and determining whether there is a rolling effect on the partial region, and, when it is determined that there is the rolling effect, correcting the partial image corresponding to the partial region.

The read-out information may include read-out speed information of the first camera or the second camera which is used while the one or more first images and the one or more second images are obtained.

The read-out information may be stored in association with at least one of the one or more first images, the one or more second images, and the composite image.

The operating method may further include receiving, from another electronic device, the one or more first images obtained by using the first camera and the one or more second images obtained by using the second camera.

According to various embodiments, an operating method of an electronic may include identifying a composite image in which sub images obtained by using a plurality of cameras corresponding to different directions are combined; receiving a request for playing the composite image; in response to the request, identifying movement information corresponding to a movement which is detected while the sub images are obtained; correcting a partial region to be displayed by using the display device among regions of the composite image, based on at least the movement information; and displaying a partial image corresponding to the corrected partial region in the composite image on the display device.

The electronic devices and the operating methods described herein may remove shakiness that can occur when a video is shot, by correcting a partial region to be displayed on the display device based on movement information among regions of a composite image when playing the video formed of composite images, and can reduce an amount of calculation and power consumption for removing the shakiness.

At least part of a device (for example, modules or functions thereof) or a method (for example, operations) described herein may be implemented by instructions stored in a non-transitory computer-readable storage medium in the form of a program module. When the instruction is executed by a processor (for example, the processor), one or more processors may perform a function corresponding to the instruction. The non-transitory computer-readable storage medium may be, for example, a memory.

Non-transitory computer-readable recording medium may include a hard disk, a floppy disk, magnetic media (for example, a magnetic tape), optical media (e.g., compact disc read only memory (ROM) (CD-ROM) and a digital versatile disc (DVD), magneto-optical media (e.g., a floptical disk)), or a hardware device (e.g., a ROM, a random access memory (RAM), or a flash memory). Also, a program command may include not only a mechanical code such as things generated by a compiler but also a high-level language code executable on a computer using an interpreter. The above hardware device may be configured to operate via one or more software modules for performing an operation of various embodiments, and vice versa.

A module or a program module according to various embodiments may include at least one of the above elements, or a portion of the above elements may be omitted, or additional other elements may be further included. Operations performed by a module, a program module, or other elements may be executed sequentially, in parallel, repeatedly, or in a heuristic method. Also, a portion of operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:
1. An electronic device comprising:
a display device; and
a processor configured to:
obtain one or more first images using a first camera corresponding to a first direction and one or more second images using a second camera corresponding to a second direction, wherein the second direction is different from the first direction,
combine the one or more first images and the one or more second images into a composite image;
receive a request for playing the composite image;
in response to the request for playing the composite image, identify movement information corresponding to a movement of the electronic device, wherein the movement is detected while the one or more first images and the one or more second images are obtained;
change a first partial region of the composite image to a second partial region of the composite image based on at least the movement information, wherein the first partial region is displayed on the display device at a first time and the second partial region is displayed on the display device at a second time; and
display the composite image included in the second partial region on the display device.

2. The electronic device of claim 1, wherein the processor is further configured to determine a location of the partial region based on a movement of the electronic device during at least a portion of a time that the partial image corresponding to the corrected partial region is displayed on the display device.

3. The electronic device of claim 2, wherein the processor is further configured to determine shake information based on the movement information and to determine the location of the partial region using the shake information.

4. The electronic device of claim 3, wherein the processor is further configured to determine a location variation amount of the partial region based on the shake information, and to change the location of the partial region determined based on the movement of the electronic device using the location variation amount.

5. The electronic device of claim 1, wherein the movement information comprises movement information of one of the first camera and the second camera according to time, which is detected during at least a portion of a time that the one or more first images and the one or more second images are obtained, and wherein the processor is further configured to perform the operation of correcting the partial region based on the time.

6. The electronic device of claim 1, wherein the processor is further configured to, as a portion of the operation of correcting the partial region, identify read-out information corresponding to one of the first camera and the second camera, to determine rolling information related to a rolling effect occurred in the partial region based on the read-out information and the movement information, and to correct the rolling effect in the partial region based on the rolling information.

7. The electronic device of claim 6, wherein the read-out information comprises read-out speed information, and
wherein the processor is further configured to, as a portion of the operation of determining the rolling information and correcting the rolling effect, identify speed information based on the movement information, to determine whether there is a rolling effect on the partial region by comparing the speed information and the read-out speed information, and, when it is determined that there is the rolling effect, to correct the partial image corresponding to the partial region.

8. The electronic device of claim 6, further comprising a memory,
wherein the memory is configured to store the read-out information associated with at least one of the one or more first images, the one or more second images, and the composite image.

9. The electronic device of claim 1, further comprising a communication module,
wherein the processor is configured to receive, from another electronic device via the communication module, the one or more first images obtained by using the first camera and the one or more second images obtained by using the second camera.

10. A method of an electronic device, the method comprising:
obtaining one or more first images using a first camera corresponding to a first direction and one or more second images using a second camera corresponding to a second direction, wherein the second direction is different from the first direction,
combining the one or more first images and the one or more second images into a composite image;
receiving a request for playing the composite image;
in response to the request, identifying movement information corresponding to a movement of the electronic device, wherein the movement is detected while the one or more first images and the one or more second images are obtained;
changing a first partial region of the composite image to a second partial region of the composite image based on at least the movement information, wherein the first partial region is displayed on the display device at a first time and the second partial region is displayed on the display device at a second time; and
displaying the composite image included in the second partial region on the display device.

11. The method of claim 10, wherein correcting the partial region comprises determining a location of the partial region based on a movement of the electronic device while displaying the partial image corresponding to the corrected partial region on the display device.

12. The method of claim 11, wherein correcting the partial region comprises:

determining shake information based on the movement information; and
determining the location of the partial region using the shake information.

13. The method of claim 12, wherein correcting the partial region comprises:
determining a location variation amount of the partial region based on the shake information; and
changing the location of the partial region determined based on the movement of the electronic device using the location variation amount.

14. The method of claim 10, wherein the movement information comprises movement information of one of the first camera and the second camera according to time, which is detected during at least a portion of a time that the one or more first images and the one or more second images are obtained, and
wherein correcting the partial region is based on the time.

15. The method of claim 10, wherein correcting the partial region comprises:
identifying read-out information corresponding to one of the first camera and the second camera;
determining rolling information related to a rolling effect occurred in the partial region based on the read-out information and the movement information; and
correcting the rolling effect in the partial region at least in part based on the rolling information.

16. The method of claim 15, wherein the read-out information comprises read-out speed information, and
wherein determining the rolling information and correcting the rolling effect comprises:
identifying speed information based on the movement information, and comparing the speed information and the read-out speed information; and
determining whether there is a rolling effect on the partial region, and, when it is determined that there is the rolling effect, correcting the partial image corresponding to the partial region.

17. The method of claim 15, wherein the read-out information is stored in association with at least one of the one or more first images, the one or more second images, and the composite image.

18. The method of claim 10, further comprising receiving, from another electronic device, the one or more first images obtained by using the first camera and the one or more second images obtained by using the second camera.

19. An electronic device comprising:
at least one sensor;
a communication module; and
a processor configured to:
obtain one or more first images and one or more second images using a first camera corresponding to a first direction and using a second camera corresponding to a second direction;
combine the one or more first images and the one or more second images into a composite image;
obtain movement information corresponding to a movement of the electronic device using the at least one sensor while obtaining the one or more first images and the one or more second images;
receive a request for playing the composite image;
in response to the request for playing the composite image, identify the movement information;
change a first partial region of the composite image to a second partial region of the composite image based on at least the movement information, wherein the first partial region is displayed on the display device at a first time and the second partial region is displayed on the display device at a second time; and display the composite image included in the second partial region on the display device.

20. The electronic device of claim 19, wherein the processor is further configured to determine a compensation amount related to at least one of the one or more first images and the one or more second images based on the movement information.

\* \* \* \* \*